United States Patent
Murai et al.

(10) Patent No.: US 8,696,841 B2
(45) Date of Patent: Apr. 15, 2014

(54) BONDING MATERIAL WITH INCREASED RELIABILITY AND METHOD OF MANUFACTURING CERAMIC BONDED BODY

(75) Inventors: Atsushi Murai, Kuwana (JP); Kazuhiro Hosoe, Aisai (JP)

(73) Assignee: Denso Corporation, Kariya (JP)

( * ) Notice: Subject to any disclaimer, the term of this patent is extended or adjusted under 35 U.S.C. 154(b) by 900 days.

(21) Appl. No.: 12/272,094

(22) Filed: Nov. 17, 2008

(65) Prior Publication Data

US 2009/0130437 A1    May 21, 2009

(30) Foreign Application Priority Data

Nov. 16, 2007  (JP) ................................ 2007-297791
Sep. 18, 2008  (JP) ................................ 2008-239241

(51) Int. Cl.
*C03B 29/00*  (2006.01)

(52) U.S. Cl.
USPC .................................. 156/89.11; 156/89.12

(58) Field of Classification Search
USPC ........................................... 156/89.11, 89.12
See application file for complete search history.

(56) References Cited

U.S. PATENT DOCUMENTS

| | | | |
|---|---|---|---|
| 6,537,431 B1* | 3/2003 | Tatsumoto et al. | 204/426 |
| 6,721,163 B2* | 4/2004 | Iwase et al. | 361/301.4 |
| 2002/0008024 A1* | 1/2002 | Sugiyama | 204/426 |
| 2003/0036262 A1* | 2/2003 | Park et al. | 438/624 |
| 2004/0011453 A1* | 1/2004 | Roosen et al. | 156/89.11 |
| 2005/0274615 A1 | 12/2005 | Naito et al. | |
| 2007/0039819 A1* | 2/2007 | Symons et al. | 204/400 |
| 2007/0095662 A1 | 5/2007 | Suzuki | |
| 2007/0214865 A1* | 9/2007 | Nakae et al. | 73/19.01 |
| 2008/0099126 A1 | 5/2008 | Yasuda et al. | |

FOREIGN PATENT DOCUMENTS

| | | | |
|---|---|---|---|
| GB | 2393332 | 3/2004 | |
| JP | 02219603 A * | 9/1990 | B28N 1/30 |
| JP | 06114817 A * | 4/1994 | |
| JP | 11-043379 | 2/1999 | |
| JP | 2004-165274 | 6/2004 | |
| JP | 2004-271515 | 9/2004 | |
| JP | 2005-274448 | 10/2005 | |

(Continued)

OTHER PUBLICATIONS

Japanese Office Action dated Jan. 12, 2010, issued in corresponding Japanese Application No. 2008-239241, with English translation.

*Primary Examiner* — Philip Tucker
*Assistant Examiner* — Alex Efta
(74) *Attorney, Agent, or Firm* — Nixon & Vanderhye P.C.

(57) ABSTRACT

A bonding material and a related manufacturing method are disclosed in which an unfired ceramic body A, internally formed with a cavity portion or a surface formed with a concaved portion, and an unfired ceramic body B are bonded to each other. The bonding material is applied to a bonding area between the unfired ceramic bodies A and B in a thickness ranging from 10 to 25 μm to provide a bonded body that is fired to obtain a ceramic bonded body. The bonding material contains an inorganic powder, an organic binder and an organic solvent in a composition to satisfy relationships $0 \leq X - Z \leq 2.6$ and $0 \leq Y - Z \leq 2.6$ where "X" represents a firing contraction ratio (%) of the unfired ceramic body A, "Y" a firing contraction ratio (%) of the unfired ceramic body B, and "Z" a firing contraction ratio of tie bonding material.

8 Claims, 5 Drawing Sheets

(56) References Cited

FOREIGN PATENT DOCUMENTS

| JP | 2006-173240 | 6/2006 |
| JP | 2007-040838 | 2/2007 |
| JP | 2007-1 21173 | 5/2007 |
| JP | 2006-030165 | 2/2008 |

\* cited by examiner

BONDING MATERIAL WITH INCREASED RELIABILITY AND METHOD OF MANUFACTURING CERAMIC BONDED BODY

CROSS REFERENCE TO RELATED APPLICATIONS

This application is based on Japanese Patent Application Nos. 2007-297791 and 2008-239241) fled on Nov. 16, 2007 and Sep. 18, 2008, respectively, the contents of which are hereby incorporated by reference.

BACKGROUND OF THE INVENTION

1. Field of the Invention

The present invention relates to a bonding material applicable to unfired ceramic bodies, made of unfired ceramic materials, to each other and a method of manufacturing a ceramic bonded body using such a bonding material.

2. Description of the Related Art

In the related art, a ceramic bonded body, composed of ceramic bodies bonded to each other, has heretofore been widely used in various technical fields. In particular, the ceramic bonded body takes the form of a stack-type gas sensing element used for detecting a specified gas concentration of, for instance, measuring gases.

The stack-type gas sensing element is comprised of a ceramic body containing a solid electrolyte, and a ceramic body in which a measuring gas chamber is defined (see Japanese Patent Application Publication Nos. 2004-165274, 2006-173240, 2006-30165 and 2004-271515), The stack-type gas sensing element can be manufactured in a manner as described below.

That is, first, ceramic powder, a binder, a plasticizer and a solvent are mixed to provide a mixture, which is then shaped to form unfired sheets each having a surface on which an electrically conductive paste is printed for forming an electrode pattern or a heating pattern or the like. Subsequently, a plurality of unfired ceramic sheets are stacked into a stack body, which is thermally compression bonded. The resulting stack body is then fired, thereby producing a gas sensing element composed of the ceramic sheets of a stacked structure.

An recent years, the stack-type gas sensing element has been complicated in structure, resulting in the occurrence of various issues in manufacturing the stack-type gas sensing element. In particular, the presence of a cavity portion through which gases are admitted to an internal part of the sensing element causes a serious problem on production of the sensing element.

That is as shown in FIG. 7A, in order to form a cavity in the sensing element, the sensing element 100 includes an unfired ceramic body 91, having a surfaces formed with a concaved portion 90 serving as a cavity portion, and an unfired ceramic body 92. The unfired ceramic body 92 is fixedly secured to the unfired ceramic body A 91 by thermal compression bonding. When this takes place, due to the thermal compression bonding, the cavity portion 90 is likely to be deformed. As a result, an issue arises with a consequence in which the unfired ceramic body A is liable to suffer crack due to contraction stress caused during a sintering step.

As shown in FIG. 7B, further, another attempt has been made to apply a bonding material 93 to a bonding area 95 between unfired ceramic bodies 91 and 92, which are consequently bonded to each other.

Such a method has no need to apply increased stress to the unfired ceramic body as that caused when achieving thermal compression bonding, enabling a reduction in the occurrence of deformation of the cavity portion 90.

With the ceramic bonded body obtained by applying the bonding material to the bonding area between the unfired ceramic bodies to bond these components, drying a resulting bonded body and firing the same, however, an issue arises with the occurrence of voids liable to be easily caused in the bonding material in the firing step. This results in deterioration in bonding strength of the bonding area. In such a case, further, there is a risk of causing delamination to occur at the bonding area.

In the related art, the bonding material, used for the unfired ceramic bodies to be bonded to each other, has been encountered with an increasing contraction ratio during the firing step. Therefore, it has been a general practice to adopt a bonding material having a greater contraction ratio than that of the unfired ceramic body. When using such a bonding material, the bonding area is contracted at a greater contraction ratio than those of the unfired ceramic bodies A and B during the sintering step, resulting in an issue of causing voids or delamination to easily occur as set forth above.

SUMMARY OF THE INVENTION

The present invention has been completed with the above issues in mind and has an object to provide a bonding material, enabling the prevention of delamination and voids caused in a bonding area on a stage after a firing step, and a method of manufacturing a ceramic bonded body using such a bonding material.

According to one aspect of the present invention, there is provided a bonding material applicable to an unfired ceramic body A, internally formed with a cavity portion or having a bonding material layer formed with a concaved portion, and an unfired ceramic body B with the bonding material interleaved therebetween to obtain a ceramic bonded body. The unfired ceramic bodies A and B satisfy the relationship expressed as $|X-Y| \leq 1$ where "X" represents a firing contraction ratio (%) of the unfired ceramic body A and "Y" represents a firing contraction ratio (%) of the unfired ceramic body B and the bonding material is applied to a bonding area between the unfired ceramic bodies A and B in a thickness ranging from 10 to 25 μm to allow the unfired ceramic bodies A and B to be bonded to each other to provide a bonded body that is fired to obtain a ceramic bonded body. The bonding material contains an inorganic powder, an organic binder and an organic solvent in a composition to satisfy relationships expressed as $0 \leq X-Z \leq 2.6$ and $0 \leq Y-Z \leq 2.6$ where "Z" represents a firing contraction ratio of the bonding material.

The bonding material of the present invention is used for manufacturing the ceramic bonded body. To obtain the ceramic bonded body, the unfired ceramic bodies A and B are prepared satisfying the relationship expressed as $|X-Y| \leq 1$. That is, the unfired ceramic bodies A and B have the firing contraction ratios with a difference lying in a value within 1%. The bonding material is applied to the bonding area between the unfired ceramic bodies A and B in the given thickness to allow the unfired ceramic bodies A and B to be bonded to each other, thereby providing the bonded body. The bonded body is then fired to obtain the ceramic bonded body. The bonding material satisfies the relationships expressed as $0 \leq X-Z \leq 2.6$ and $0 \leq Y-Z \leq 2.6$, where "X" represents the fixing contraction ratio (%) of the unfired ceramic body A;

"Y" represents the firing contraction ratio (%) of the unfired ceramic body B; and "Z" represents the firing contraction ratio of the bonding material.

When using such a bonding material in bonding the bonding area of the unfired ceramic bodies A and B, the bonding material applied to the bonding area is less liable to suffer from the occurrence of voids. This enables delamination from occurring in the bonding area on a stage subsequent to the firing step. Thus, the ceramic bonded body can be obtained in a structure bonded with increased strength.

That is, the bonding material has the firing contraction ratio equal to or less than those of the unfired ceramic bodies A and B with a difference determined to have an upper limit of 2.6. This enables a reduction in the difference between the firing contraction ratios of the unfired ceramic bodies A and B and the firing rate of the bonding material. Therefore, this enables a reduction in the occurrence of voids in the bonding area after the firing step, while preventing delamination from occurring in the bonding area.

More particularly, with the relationships established as $0 \leq X-Z \leq 2.6$ and $0 \leq Y-Z \leq 2.6$, during the firing step, the bonding material can have contraction with a rate comparable to or less than those of the unfired ceramic bodies A and B. Therefore, the bonding material can be caused to contract in a way to be tensioned from the unfired ceramic bodies A and B during contraction in the firing step. This prevents the occurrence of voids in the bonding area, while enabling the suppression of delamination caused in the bonding area.

In the related art, the unfired ceramic bodies A and B have been bonded to each other using the bonding material that does not satisfy the relationships established as $0 \leq X-Z \leq 2.6$ and $0 \leq Y-Z \leq 2.6$. Therefore, the bonding area has been encountered with the occurrence of voids and delamination in a manner set forth above.

Further, the bonding material is applied in the given thickness as described above, This provides an ease of applying the bonding material with a uniform thickness. That is, the bonding material can be applied by, for instance, screen-printing or the like in a favorable effect of achieving the printing with no trace. From such a viewpoint, the bonding area is less likely to suffer from the occurrence of voids or delamination after the firing step.

Further, the bonding material can be used in bonding the unfired ceramic bodies A and B having the firing contraction ratios with a difference determined to be 1% or less. This prevents voids or delamination from occurring in the bonding area during the firing step as a result of the difference between the firing contraction ratios of the unfired ceramic bodies A and B occurring during the firing step.

Thus, the present invention can provide the bonding material that can suppress the occurrence of voids and delamination in the bonding material during the firing step.

Another aspect of the present invention provides a method of manufacturing a ceramic, bonded body using an unfired ceramic body A, internally formed with a cavity portion or having a bonding material layer formed with a concaved portion, and an unfired ceramic body B bonded to the unfired ceramic body A and then fired to obtain the ceramic bonded body. The method comprises the steps of: preparing the unfired ceramic bodies A and B satisfying the relationship expressed as $|X-Y| \leq 1$ where "X" represents a firing contraction ratio (%) of the unfired ceramic body A and "Y" represents a firing contraction ratio (%) of the unfired ceramic body B; applying s a bonding material onto at least one bonding surface of the unfired ceramic bodies A and B in a thickness ranging from 10 to 25 μm; bonding the unfired ceramic bodies A and B after the step of applying the bonding material for preparing a bonded body; and firing the bonded body to prepare the ceramic bonded body. The bonding material contains an inorganic powder, an organic binder and an organic solvent in a composition to satisfy relationships expressed as $0 \leq X-Z \leq 2.6$ and $0 \leq Y-Z \leq 2.6$ where "Z" represents a firing contraction ratio of the bonding material.

With the manufacturing method of the second aspect of the present invention, the applying step, the bonding step and the firing step are conducted, thereby preparing the ceramic bonded body. The manufacturing method includes preparing the unfired ceramic bodies A and B satisfying the relationship expressed as $|X-Y| \leq 1$ where "X" represents the firing contraction ratio (%) of the unfired ceramic body A and "Y" represents the firing contraction ratio (%) of the unfired ceramic body B. In addition, the manufacturing method employs the bonding material contain the inorganic powder, the organic binder and the organic solvent in the composition to satisfy relationships expressed as $0 \leq X-Z \leq 2.6$ and $0 \leq Y-Z \leq 2.6$ where "Z" represents the firing contraction ratio of the bonding material.

Therefore, the ceramic bonded body has the bonding area that can be suppressed from the occurrence of voids and delamination caused upon the firing step, This enables the ceramic bonded body to be obtained in a structure bonded with increased strength.

The manufacturing method of the present invention employs the unfired ceramic bodies A and B and the bonding material, which have the given firing contraction ratios under the relationship set forth above. Therefore, the firing step results in a reduction in a difference in the firing contraction ratios of the unfired ceramic bodies A and B and the bonding material.

More particularly, with the relationships established as $0 \leq X-Z \leq 2.6$ and $0 \leq Y-Z \leq 2.6$ the bonding material can have contraction with a rate comparable to or less tan those of the unfired ceramic bodies A and B. Thus, the bonding material is caused to contract in a way to be tensioned from the unfired ceramic bodies A and B during the firing step. This prevents the occurrence of voids in the bonding area, while enabling the suppression of delamination caused in the bonding area.

In the related art, the unfired ceramic bodies A and B have been bonded to each other using the bonding material that does not satisfy the relationships established as $0 \leq X-Z \leq 2.6$ and $0 \leq Y-Z \leq 2.6$. Therefore, the bonding area has been encountered with the occurrence of voids and delamination in a manner set forth above.

Further, during the applying step, the bonding material is applied in the given is thickness as described above. This enables the bonding material to be applied with a uniform thickness. That is, the bonding material can be applied by, for instance, screen-printing or the like in a favorable effect of achieving the printing with no trace. From such a viewpoint, the bonding area is less likely to suffer from the occurrence of voids or delamination after the firing step.

The manufacturing method of the present invention employs the unfired ceramic bodies A and B satisfying the relationship expressed as $|X-Y| \leq 1$ as set forth above. That is, the unfired ceramic bodies A and B have the firing contraction ratios with a difference determined to be 1% or less. This prevents voids or delamination from occurring in the bonding area during the firing step as a result of the difference between the firing contraction ratios of the unfired ceramic bodies A and B occurring during the firing step.

As set forth above, the second aspect of the present invention can provide the method of manufacturing the ceramic bonded body that can suppress voids and delamination from occurring in the bonding area after the firing step.

DETAILED DESCRIPTION OF THE PREFERRED EMBODIMENTS

Figure 1:
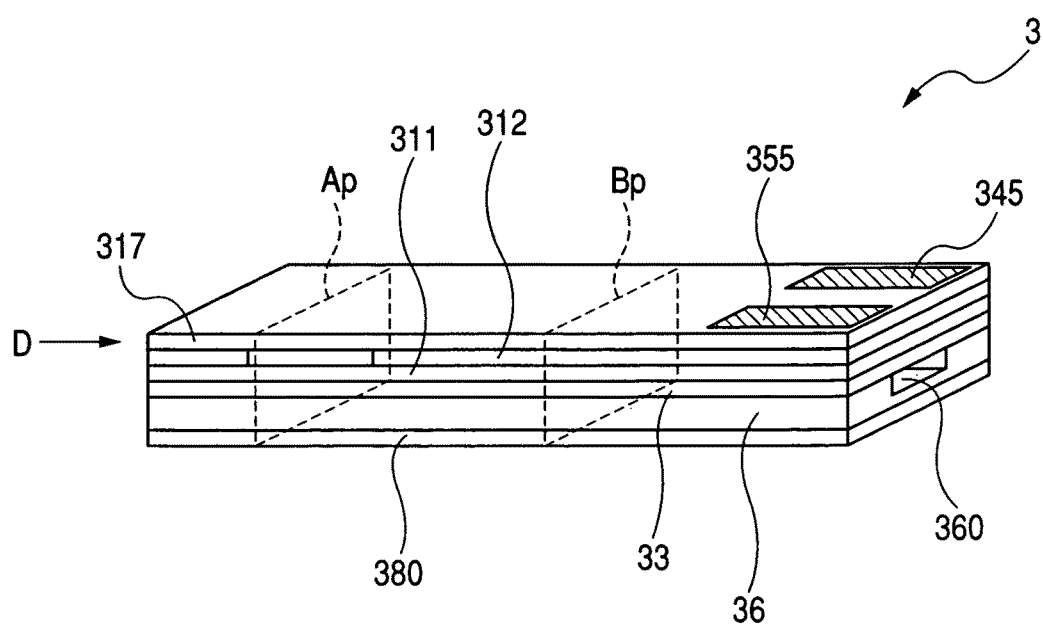
FIG. 1 is a perspective view showing an external appearance of a ceramic bonded body (gas sensing element) manufactured upon using a bonding material of an embodiment according to the present invention.

Now, a bonding material of an embodiment according to the present invention and a method of manufacturing a ceramic bonded body using such a bonding material are described below in detail with reference to the accompanying drawings. However, the present invention is construed not to be limited to such an embodiment described below and technical concepts of the present invention may be implemented in combination wit other known technologies or the other technology having functions equivalent to such known technologies.

A bonding material of the present embodiment will be described below in detail.

The bonding material is used for bonding unfired ceramic bodies A and B. The unfired ceramic bodies A and B are selected to satisfy the relationship expressed as $|X-Y| \le 1$ where "X" represents a firing contraction ratio (%) of the unfired ceramic body A and "Y" represents a firing contraction ratio (%) of the unfired ceramic body B firing contraction ratios. That is, the unfired ceramic bodies A and B have the firing contraction ratios with a difference lying within 1%. The bonding material is applied to a bonding area between the unfired ceramic bodies A and B in a given thickness ranging from 10 to 25 μm. This allows the unfired ceramic bodies A and B to be bonded to each other, thereby providing a bonded body. The bonded body is then fired to obtain a ceramic bonded body.

If the firing contraction ratios of the unfired ceramic bodies A and B have a difference exceeding 1%, then it is likely there is a risk of causing delamination to occur on a bonding boundary layer due to contractions of the unfired ceramic bodies A and B during a firing step.

Further, if the bonding material is applied in the thickness less than 10 μm, i.e., when applying the bonding material by, for instance, screen printing technique, there is likelihood that the screen printing easily remains with a mesh trace or the like. In contrast, if the thickness exceeds 25 μm, then there is a risk of causing a difficulty of applying the bonding material with a uniform thickness. As a result, in any case, there is likelihood of a risk arising to cause voids to easily occur in the bonding material after the firing step.

The bonding material is selected to satisfy die relationships expressed as $0 \le X-Z \le 2.6$ and $0 \le Y-Z \le 2.6$, where "X" represents the firing contraction ratio (%) of the unfired ceramic body A; "Y" represents the firing contraction ratio (%) of the unfired ceramic body B; and "Z" represents the firing contraction ratio of the bonding material.

If the bonding material is deviated from a range of such relationships, in any case, there is a risk of causing voids to occur in the bonding area after the firing step. In addition, if values of "X—Z" and "Y—Z" exceed a value of 2.6 to a large extent, then there is a risk of causing delamination to occur in the bonding area after The firing step.

The bonding material may preferably have the relationships expressed as $0 \le X-Z \le 1.6$ or $0 \le Y-Z \le 1.7$.

That is, it may suffice for die bonding material to satisfy the relationships expressed as $0 \le X-Z \le 2.6$ and $0 \le Y-Z \le 2.6$ while satisfying at least one of the relationships expressed as $0 \le X-Z \le 1.7$ and $0 \le Y-Z \le 1.7$.

In such a case, the bonding area has no occurrence of voids and delamination.

The firing contraction ratio can be calculated by expressing a dimension subsequent to a firing step in terms of a percentage relative to the dimension before the firing step.

That is, measurements were conducted to check the dimensions (reference dimensions) of the unfired ceramic bodies A and B each formed in a given shape, and the bonding material before the firing step. Then, the respective dimensions (i.e., contracted dimensions) after the firing step were measured. The contraction ratio can be calculated using a formula expressed as Contraction rate (%)=Contraction Rate/Reference Dimension×100.

Further, the bonding material may be used for bonding the unfired ceramic body A, internally formed with a cavity portion or having a surface, placed on a bonding surface, which is partly formed with a concaved portion, and the unfired ceramic body B. The unfired ceramic body B may have or may not have the cavity portion or the surface partly formed with the concaved portion.

The ceramic bonded body may be preferably a gas sensing element.

In this case, the bonding material can make full use of the excellent characteristics to of the bonding material that can bond the unfired ceramic bodies A and B with almost no occurrence of voids or delamination at a bonding area between the unfired ceramic bodies A and B. With the gas sensing element, a passage needs to be internally formed in the element to admit gases thereto. This is because there is a need for bonding one unfired ceramic body, having an inside formed with the is concaved portion or the surface, placed on the bonding area, which is partly formed with the concaved portion, and the other unfired ceramic body with the use of the bonding material.

The unfired ceramic bodies A and B may be or may not be made of the same materials.

The bonding material may preferably contain an inorganic powder, an organic binder and an organic solvent in a composition in which the organic binder has a blending ratio adjusted in terms of especially the inorganic powder for thereby enabling a control of the firing contraction ratio of the bonding material. Then, suitably adjusting such a composition enables the relationship between the firing contraction ratios of the first and second firing ceramic bodies and the firing contraction ratio of the binding material to be adjusted in a range to satisfy the relationships expressed as $0 \leq X-Z \leq 2.6$ and $0 \leq Y-Z \leq 2.6$.

Further, the bonding material may preferably contain the same ceramic material as that of at least one of the unfired ceramic bodies A and B as the inorganic powder.

This makes it possible to easily cause the firing contraction ratio of the bonding material to be close to the firing contraction ratios of the unfired ceramic bodies A and B, making it easy to adjust the composition satisfying the relationships expressed as $0 \leq X-Z \leq 2.6$ and $0 \leq Y-Z \leq 2.6$.

The unfired ceramic bodies A and B may be preferably made of alumina and/or zirconia.

This enables the bonding material to be used to obtain the ceramic bonded body suited for use in the gas sensing element.

Under a case where the unfired ceramic bodies A and B are made of alumina and/or zirconia, the bonding material may preferably contain at least alumina and/or zirconia as the inorganic powder. In an alternative, the bonding material may preferably include a mixture of alumina and zirconia.

In this case, the unfired ceramic bodies A and B have the firing contraction ratios that are easily made closer to the firing contraction, ratio of the bonding material. This makes it possible to satisfy the relationships expressed as $0 \leq X-Z \leq 2.6$ and $0 \leq Y-Z \leq 2.6$.

Next, the bonding material may preferably have a viscosity ranging from 15 to 150 Pa·s.

If the bonding material has the viscosity less than 15 Pa·s, there is a risk of the occurrence of an increasing wet area during the application of the bonding material with a difficulty caused in applying the bonding material in uniform thickness. In contrast, if the bonding material has the viscosity exceeding 150 Pa·s, there is a risk of the occurrence in which uneven portions occur on a surface when applied with the bonding material with a resultant difficulty of applying the bonding material in uniform thickness.

In carrying out a second aspect of the present invention, the applying, the bonding step and the firing step are implemented as set forth above.

The bonding step may preferably include a first bonding step of sticking the unfired ceramic bodies A and B via a bonding surface applied with the bonding material and pressing a bonding area between the unfired ceramic bodies A and B at a temperature of 40° C. or less under a pressure ranging from 0.80 to 6.5 MPa, and a second bonding step of drying the bonded portion at a temperature ranging from 70° C. to 120° C.

In this case, conducting the first bonding step at a low temperature (of 40° C. or less) under a high pressure (ranging from 0.80 to 6.5 MPa) allows the unfired ceramic bodies A and B to be bonded to each other with causing any deformation. In addition, conducting the second bonding step of drying the bonded portion at a high temperature (ranging from 70° C. to 120° C.) allows the bonding material to be completely solidified. Thus, the unfired ceramic bodies A and B can be bonded to each other with increased strength. That is, such a case enables the unfired ceramic bodies A and B to be bonded to each other with adequately increased strength without causing any deformation.

If the bonding step is conducted at the temperature exceeding 40° C. or under the pressure exceeding 6.5 MPa, a risk arises for at least one of the unfired ceramic bodies A and B to deform. On the contrary, if the bonding step is conducted under the pressure less than 0.80 MPa, the first bonding step is inadequate and there is a risk to occur of a slippage caused in the bonding area during a shift from the first bonding step to the second bonding step.

Further, if the second bonding step is conducted at a temperature less than 70° C., it becomes difficult to completely dry and solidify the bonding material. In addition, a risk arises with the occurrence of an increase in a drying time period with a resultant drop in productivity. Meanwhile, if the temperature of the second bonding step exceeds 120° C., then organic components of the binder or the like contained in the unfired ceramic body A and/or the unfired ceramic body B are softened and there is a risk of causing the unfired ceramic body A and/or the unfired ceramic body B to be deformed.

The second bonding step enables the unfired ceramic bodies A and B to be adequately bonded to each other even under, for instance, the pressure of 0.60 MPa or less. For the bonding, for instance, the unfired ceramic bodies A and B may be pressed with a stone. If the pressuring pressure of the second bonding step exceeds 0.60 MPa, the unfired ceramic bodies A and B remain under high temperatures between 70° C. and 120° C. and, hence, there is a risk to arise with the occurrence of deformation caused in the unfired ceramic body A and/or the unfired ceramic body B.

The first bonding step may be preferably conducted at pressure of 0.60 MPa or less.

In this case, since the first bonding step can be conducted under a state closer to a so-called vacuum, i.e., at a high vacuum state, air present in the bonding area between the unfired ceramic bodies A and B can be removed. This results in a capability of minimizing the occurrence of voids in the bonding area.

Further, the first bonding step may be preferably conducted upon causing the unfired ceramic bodies A and B to stick to each other with the bonding material applied to the bonding area which is subsequently maintained under an atmospheric pressure of 0.60 MPa or less.

If a vacuum state is present before the unfired ceramic bodies A and B are caused to stick to each other, the bonding material on a bonding surface is caused to dry, thereby causing a risk to occur with degradation in a bonding force.

Further, the second bonding step can be conducted under a atmospheric condition or a vacuum state (pressure of 0.60 MPa or less) like the status set forth above.

[Embodiment]

(First Embodiment)

Now, a bonding material of a first embodiment according to the present invention is described below in detail with reference to the accompanying drawings.

The bonding material of the present embodiment is used for bonding an unfired ceramic body A, having an inside formed with a cavity portion or a surface partially formed with a concaved portion on a side serving as a bonding surface, and an unfired ceramic body B to each other.

The bonding material is applied to a bonding area between the unfired ceramic bodies A and B, having firing contraction ratios with a difference of 1% or less in a thickness of 10 to 25 μm. This allows the unfired ceramic bodies A and B to be bonded to each other at the bonding area to obtain a bonded body, which is then fired to obtain a ceramic bonded body.

The bonding material contains an inorganic powder, an organic binder and an organic solvent. In particular, with the present embodiment, the inorganic powder, the organic binder and the organic solvent include alumina powder, polyvinyl butyral (PVB) and terpineol, respectively.

Further, the bonding material has a composition to satisfy the relationships expressed as $0 \leq X—Z \leq 2.6$ and $0 \leq Y—Z \leq 2.6$ where "X" represents the firing contraction ratio of tie unfired ceramic body A, "Y" the firing contraction ratio of the unfired ceramic body B and "Z" the firing contraction ratio of the bonding material.

With the present embodiment, a gas sensing element is manufactured as the ceramic bonded body.

As shown in FIGS. 1 to 4, the gas sensing element (ceramic bonded body) 3 of the present embodiment comprises a sensing layer 330. The sensing layer 330 includes a solid electrolyte body 33 having oxygen ion conductivity. The solid electrolyte body 33 has one surface formed with a measuring gas side electrode 34 and the other surface formed with a reference gas side electrode 35. The reference gas side electrode 35 has one end to which a lead portion 351 is electrically connected.

Further, the one surface of the solid electrolyte body 33, on which the measuring gas side electrode 34 is formed, is formed with a first insulation layer 311. The first s insulation layer 311 has one surface, placed in opposition to die other surface facing the solid electrolyte body 33, which is formed with a lead portion 341 in electrical connection to the measuring gas side electrode 34.

Furthermore, the first insulation layer 311 has one end portion through which a cavity portion 315 vertically extends from the one surface of the first insulation layer 311 to the other surface thereof. The cavity portion 315 serves as a penetrating path through which a flow of exhaust gases is admitted to the gas sensing element 3 for detection.

Furthermore, a second insulation layer 312 is stacked on the first insulation layer 311 at the one surface thereof. The second insulation layer 312 includes a porous diffusion resistance region 313 and a non-diffusion region 314. The second insulation layer 312 is stacked on the first insulation layer 311 such that the porous diffusion resistance region 313 covers the cavity portion 315 of the first insulation layer 311. The porous diffusion resistance region 313 is made of porous material having gas permeability. The porous diffusion resistance region 313 has a side surface that takes the form of a structure to admit the flow of measuring gases to the measuring gas side electrode 34.

Moreover, a third insulation layer 317 is stacked on the second insulation layer 312. The third insulation layer 317 has one end carrying thereon first and second external terminal portions 345 and 355. The first external technical portion 345 is electrically connected to the measuring gas side electrode 34 and the second external terminal portion 355 is electrically connected to the reference gas side electrode 35.

Figure 2:
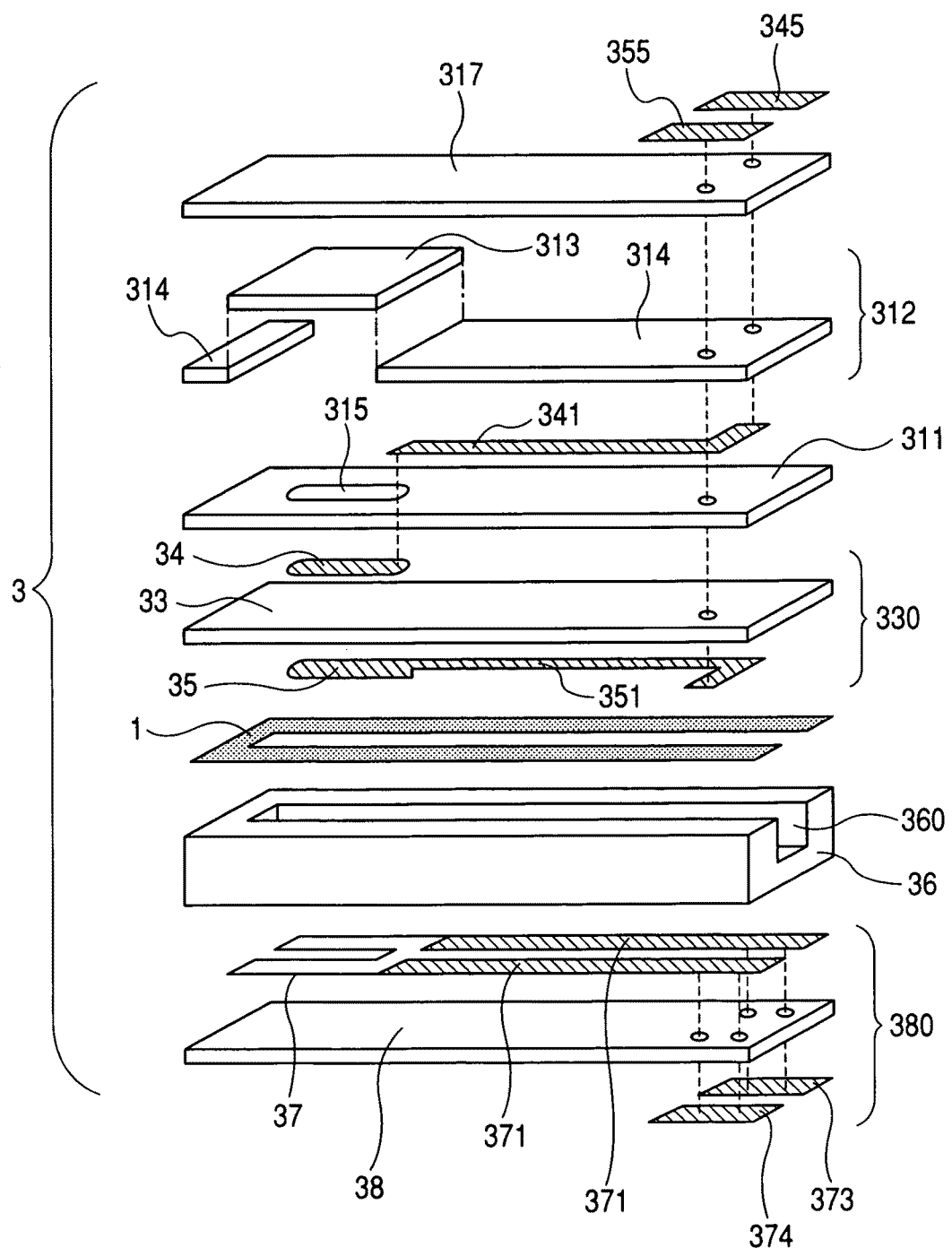
FIG. 2 is an exploded perspective view showing a structure of the ceramic bonded body (gas sensing element) shown in FIG. 1.
Figure 3:
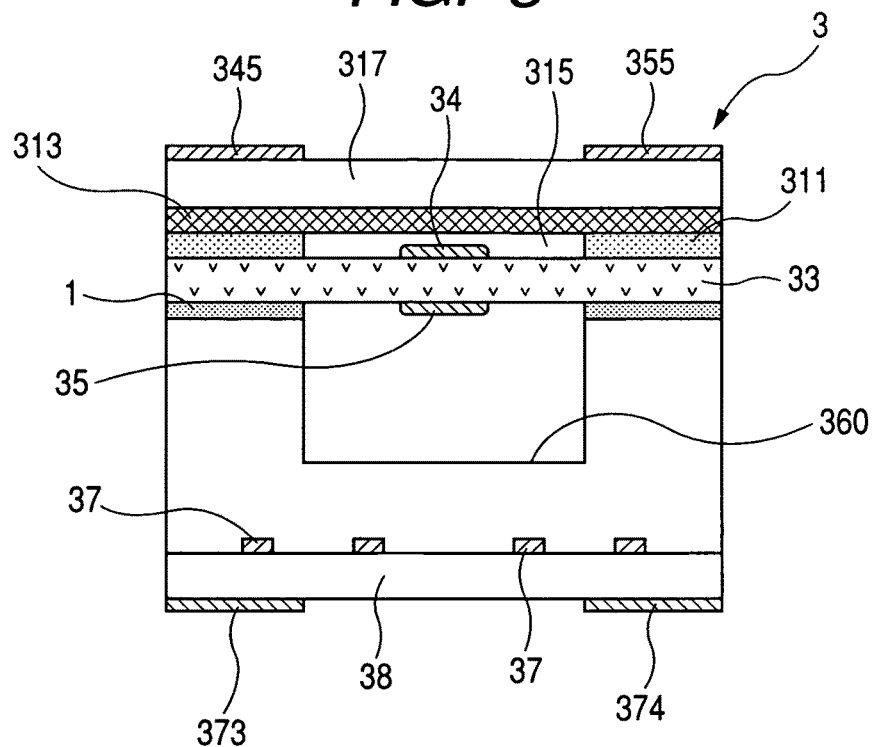
FIG. 3 is an illustrative view of a cross-sectional structure of the ceramic bonded body (gas sensing element) on a plane Ap in FIG. 1 as viewed in a direction indicated by "D" in FIG. 1.
Figure 4:
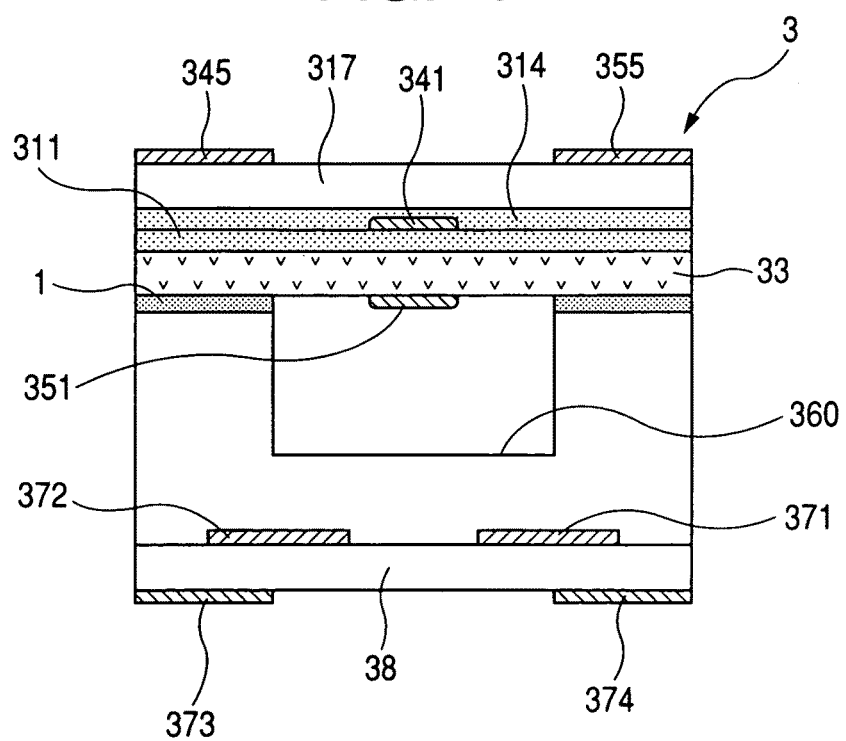
FIG. 4 is an illustrative view of a cross-sectional structure of the ceramic bonded body (gas sensing element) on a plane Bp as viewed in the direction indicated by "D" in FIG. 1.

As shown in FIG. 2, the solid electrolyte body 33 has the other surfaces carrying thereon the reference gas side electrode 35, on which a reference gas airspace forming layer 36 is laminated so as to cover the reference gas side electrode 35. The reference gas airspace forming layer 36 has one surface formed with a reference gas airspace 360 covered with the solid electrolyte body 33 to define an elongate channel. This permits atmospheric air to be introduced as reference gas to the reference gas airspace 360.

The reference gas airspace forming layer 36 has the other surface, placed in opposition to the reference gas side electrode 35, on which a heater layer 380 is laminated. The heater layer 380 includes a heater portion 37 for developing heat when applied with electric power, lead portions 371 extending from one end of the heater portion 37 to apply electric power thereto, and a heater substrate 38 having one surface carrying thereon the heater portion 37 and the lead portions 371.

The heater substrate 38 has the other surface, placed in opposition to the one surface on which the heater portion 37 and the lead portions 371 are formed, which is formed with external terminal portions 373 and 374 in a spaced relation from each other. The external terminal portions 373 and 374 are electrically connected to the lead portions 371 formed on the heater substrate 38 at the one surface thereof on which the heater portion 38 is formed.

With the gas sensing element 3 of the present embodiment, the solid electrolyte body 33 and the reference gas airspace forming layer 36 are bonded to each other with a bonding material layer 1 with the bonding material being solidified.

The ceramic bonded body (gas sensing element) of the present embodiment is manufactured upon executing an applying step, a bonding step and a firing step.

In conducting the applying step, the bonding material is applied to at least one of bonding surfaces of the unfired ceramic bodies A and B with a thickness of 10 to 25 μm.

In the bonding step, further, the unfired ceramic bodies A and B are bonded to each other after the applying step having been executed, thereby preparing a bonded body.

Subsequently, in the firing step, the bonded body is fired, thereby preparing a ceramic bonded body.

The unfired ceramic bodies A and B are selected to be of types satisfying the relationship expressed as $|X—Y| \leq 1$ where "X" represents a firing contraction ratio (%) of the unfired ceramic body A and "Y" represents a firing contraction ratio (%) of the unfired ceramic body B. In addition, the bonding material contains the organic powder, the inorganic powder, the organic binder and the organic solvent in the composition satisfying the relationships as expressed as $0 \leq X—Z \leq 2.6$ and $0 \leq Y—Z \leq 2.6$ where "Z" represents a firing contraction ratio (%) of the bonding material.

With the present embodiment, the bonding step includes first and second bonding steps.

In the first bonding step, the unfired ceramic bodies A and B are stuck to each 15 other with the bonding area, applied with the bonding material, which is pressurized under a pressure ranging from 0.80 to 6.5 MPa at a temperature of 40° C. or less. In addition, in the second bonding step, the bonding area is dried at a temperature aging from 70° C. to 120° C.

Next, a method of manufacturing the gas sensing element of the present embodiment will be described below with reference to FIG. 2.

In the method of manufacturing tie gas sensing element 3 of the present embodiment, first and second unfired ceramic bodies are manufactured fox the porous diffusion resistance region 313 and the reference gas airspace forming layer 36, respectively, as shown FIG. 2. Then, the first and second unfired ceramic bodies are bonded to each other under bonded states, thereby forming a bonded body. The bonded body is fired, thereby obtaining the gas sensing element (ceramic bonded body) 3.

First, description is made of how the heater layer 380 is prepared.

12 g of polyvinyl butyral (VB) serving as a binder, 9 g of benzyl butyl phthalate (BBP) serving as a plasticizer, 2 g of sorbitan trioleate acting as a dispersant, and a given amount of mixed solvents containing ethanol, 2-butanol and isopentyl acetate were mixed to 100 g of alumina powder serving as ceramic powder, thereby preparing slurry. By using such slurry, another unfired ceramic body is prepared in a sheet-like shape for the ceramic substrate 38 by, for instance, a doctor blade method.

Subsequently, electrically conductive paste is applied to a surface of the unfired ceramic body for the heater substrate 38 to form layers for the heater portion 37 having electrical conductivity, the lead portions 371 and the external terminal portions 373 and 374.

Further, an insulation paste layer is formed on the surface of the unfired ceramic body for the heater substrate 38 in an area, in which electrically conductive paste for the heater portion 37 is absent, with the same thickness as that of electrically conductive paste for the heater portion 37. This enables the heater portion 37 to eliminate difference in level on electrically conductive paste. Then, the first and second unfired ceramic bodies are dried at a temperature of 80° C. for 30 minutes.

Furthermore, examples of electrically conductive paste for the heater portion 37 may include a mixture of a given amount of a binder and solvent or the like that are mixed to a mixture of 1.8 g of alumina powder and 15 g of platinum.

Moreover, examples of electrically conductive paste for the external terminal portions 373 and 374 and the lead portions 371 may include a mixture of a given amount of a binder and solvent or the like that are mixed to a mixture of 1 g of alumina powder and 15 g of platinum.

Next description will be made of how the reference gas airspace forming layer 36 is formed.

The unfired ceramic body for the reference gas airspace forming layer 36 may be made of the same material as that of the unfired ceramic body for the heater substrate 38 in the same method as that in which the unfired ceramic body for the heater substrate 38 is prepared. Then, a plurality of sheet-like unfired ceramic bodies for the reference gas airspace forming layer 36 are stacked on each other.

Subsequently, the unfired ceramic bodies (in a stacked body) for the reference gas airspace forming layer 36 and the unfired ceramic body for the heater substrate 38 are pressure bonded by heat bonding (at a temperature of 80° C. under a pressure of 50 MPa for 30 minutes) using a WIP (Warm Isostatic Press). Then, cutting work is conducted on the surface of the unfired ceramic bodies for the reference gas airspace forming layer 36, thereby forming a concaved portion. In addition, in conducting heat bonding, the WIP device may be replaced by a device using a press machine to press the unfired ceramic bodies after fitting the unfired ceramic bodies into a molding die.

In such a way set forth above, it becomes possible to obtain an unfired ceramic is body (unfired ceramic body A) composed in a unitary structure including the unfired ceramic body for the heater substrate 38 and the unfired ceramic bodies for the reference gas airspace forming layer 36. The unfired ceramic body A has one surface formed with the concaved portion to form the reference gas airspace 360.

In addition, the reference gas airspace forming layer 36 may be formed of one sheet of the unfired ceramic bodies for the reference gas airspace forming layer 36 formed with a large thickness.

Next a method of manufacturing the sensing layer 330 is described.

The solid electrolyte body 33 is prepared using slurry obtained by mixing 7 g of polyvinyl butyral (PVB) resin as an organic binder, 13 g of benzyl butyl phthalate (BBP) as a plasticizer. a given volume of mixed solvents containing ethanol, 2-butanol and isopentyl acetate to 100 g of zirconia powder. Using such slurry allows an unfired ceramic body to be prepared in a sheet-like shape for the solid electrolyte body 33 by, for instance, a doctor blade method in the same manner as that conducted for preparing the unfired ceramic body for the heater substrate 38.

Subsequently, electrically conductive paste is printed on the surface of the unfired ceramic body for the solid electrolyte body 33 for forming the measuring gas side electrode 34, the reference gas side electrode 35 and the lead portion 351.

Further, examples of paste for the measuring gas side electrode 34, the reference gas side electrode 35 and the lead portion 351 may include a mixture obtained by mixing a given amount of a binder and a solvent to a mixture including, for instance, 2.9 g of zirconia powder and 20 g of platinum.

Furthermore, examples of paste for the lead portion 341 may include a mixture obtained by mixing a given amount of a binder and a solvent to a mixture including 1.6 g of alumina powder and 20 g of platinum.

Next, an unfired ceramic body for the first insulation layer 311 is prepared on one surface of the unfired ceramic body for the solid electrolyte body 33 using the same material as that prepared for the unfired ceramic body for the heater substrate 38 in the same method for the unfired ceramic body of the heater substrate 38 to be prepared. The unfired ceramic body for the first insulation layer 311 has a burnable region, made of carbon material, which forms the cavity portion 315 when burnt off during a firing step.

Then, electrically conductive paste for the lead portion 341 having electrical conductivity is printed on a surface of the unfired ceramic body for the first insulation layer 311.

Next, a method of preparing an unfired ceramic body for the porous diffusion resistance layer 313 will be described below.

In preparing slurry as ceramic powder, 100 g of mixed alumina powder is prepared using, for instance, alumina powder having an average particle diameter of 0.3 µm with a tap density of 1.4 g/cc and alumina powder having an average particle diameter of 0.4 µm with a tap density of 0.81 g/cc, which are mixed in a ratio of 1:9 respectively. The resulting mixed alumina powder is added with 22 g of polyvinyl butyral (PVB) resin serving as a binder, 8 g of benzyl butyl phthalate (BBP) serving as a plasticizer, 2 g of sorbitan trioleate acting as a dispersant, and a given amount of mixed solvents including ethanol, 2-butanol and isopentyl acetate, thereby preparing slurry. Using such slurry allows an unfired ceramic body to be prepared in a sheet shape for the porous diffusion resistance layer 313 by, for instance, the doctor blade method.

Subsequently, two unfired ceramic bodies for the non-diffusion layer 314, each having the same thickness as that of the porous diffusion resistance layer 313, are prepared with the same material as that prepared for the unfired ceramic body for the heater substrate 38 described above in the same method conducted for preparing the unfired ceramic body for the heater substrate 38. Then, the two unfired ceramic bodies for the non-diffusion layer 314 are juxtaposed so as to interleave the unfed ceramic body for the porous diffusion resistance layer 313 as shown in FIG. 2, resulting in the formation of an unfired ceramic body for the second insulation layer 312.

Subsequently, an unfired ceramic body for the third insulation layer 317 is prepared with the same material as that prepared for the unfired ceramic body for the heater substrate 38 in the same method conducted for preparing the unfired ceramic body for the heater substrate 38.

Then, electrically conductive paste is printed on a surface of the unfired ceramic body for the third insulation layer 317 in layers to form the external terminal portions 345 and 355 each with electrical conductivity.

Further, examples of electrically conductive paste for the external terminal portions 345 and 355 may include a mixture, obtained by adding 15 g of platinum to 1 g of alumina powder, to which a given amount of a binder and solvent or the like are mixed.

Next, the unfired ceramic bodies for the sensing layer 330 and the first to third insulation layers are stacked on one another to form a stacked body, which is unitarily press bonded by heat bonding. This results in the formation of an unfired ceramic body (unfired ceramic body B) with plural unfired ceramic bodies being unitarily stacked.

Moreover, the unfired ceramic bodies A and B had bonding surfaces formed with convexed portions each of which had a height of 80% or less of a minimum printed film thickness of the bonding material described below (in an area except for the concaved portion (duct portion) formed for realizing a sensing characteristic)).

If the convexed portion of each unfired ceramic body has a height greater than the minimum printed film thickness, then a risk arises with a consequence of having a localized area with a nonuniform film thickness, causing a degraded bonding effect.

Thereafter, the unfired ceramic body A (an unified product comprised of the heater substrate 38 and the reference gas airspace forming layer 36) and the unfired ceramic body B (another unified product comprised of the solid electrolyte body 33 and the first to third insulation layers 311, 312 and 317) were bonded to each other by means of the bonding material.

More particularly first, the bonding material was printed on a bonding surface of the unfired ceramic body B in a thickness of 18 μm by screen printing (in the applying step mentioned above), through which the unfired ceramic bodies A and B were stuck to each other, providing a stacked body. The stacked body was press bonded under an evacuated condition, i.e., under a condition of an atmospheric pressure of 0.085 Ma, at a temperature of 25° C. with a bonding pressure of 3.0 MPa for 240 seconds (in the first bonding step mentioned above). Thereafter, the stacked body was dried under the condition of atmospheric pressure at a temperature of 85° C. with a bonding pressure applied to the bonding area with a pressure of 0.30 MPa for 30 minutes (in the second bonding step mentioned above). Thereafter, the stacked body was cooled down to a room temperature (at 25° C.), thereby obtaining a bonded body.

With such an example mentioned above, the bonding process was conducted upon implementing the step (first bonding step) of bonding the unfired ceramic bodies at the low temperature with the high pressure first under the highly evacuated condition and the subsequent step (second bonding step) of bonding the unfired ceramic bodies at the high temperature with the low pressure under atmospheric condition. In addition, the second bonding step may be conducted under a highly evacuated condition.

After applying the bonding material onto the bonding area, the unfired ceramic bodies A and B were stuck to each other for a sticking time interval of 20 minutes or less after the applying step conducted by printing the bonding material. If the sticking time interval continues for a long period of time in excess of such a value, then there is a risk to occur with a consequence of the bonding material being dried with resultant degradation in bonding effect.

The bonding material was prepared in a manner as described below.

That is, first, an organic binder (polyvinyl butyral (PVB) resin) was added to an organic solvent (terpineol) while stirring the same, after which resulting mixture was mixed until the organic binder was completely dissolved. In this moment, the organic solvent and the organic binder were selected in a mixing ratio (in weight ratio) expressed as organic solvent: organic binder=75:25. Subsequently, inorganic powder (alumina powder) was mixed to mixed liquid containing the organic solvent and the organic binder. Alumina powder was added to resulting mixed liquid such that the amount of the organic binder in resulting mixed liquid had a ratio of 10 parts by weight with respect to the organic binder 100 parts by weight of alumina powder. Then, a suitable amount of organic solvent was further added to resulting mixture liquid, after which resulting mixture was kneaded to reach a uniform condition by using three rollers. After the kneading step, the absence of coarse particles with a particle diameter of 10 μm or more on a grind gauge reading was confirmed, thereby conducting viscosity adjustment using the organic solvent.

In this example, moreover, although alumina powder was used as inorganic powder, it may be possible to employ the same zirconia powder as that used for preparing the solid electrolyte body. In addition, it may be possible to employ mixed powder of alumina powder and zirconia powder.

Next, the unified product (bonded body), resulting from the unfired ceramic bodies A and B bonded to each other by means of the bonding material, was fired (in the firing step set forth above). The firing step was conducted under a condition in which the temperature was raised from a room temperature up to a temperature of 1480° C. at a temperature rising rate of 60° C./h and kept at a temperature of 1480° C. for two hours, after which the unified product was cooled. This allowed the gas sensing element 3 to be obtained as shown in FIGS. 1 to 4. This was treated as a test piece X11.

With the gas sensing element (test piece X11), the bonding material was employed satisfying the relationships expressed as $0 \leq X - Z \leq 2.6$ and $0 \leq Y - Z \leq 2.6$ where "X" represents the firing contraction ratio of the unfired ceramic body A, "Y" the firing contraction ratio of the unfired ceramic body B and "Z" the firing contraction ratio of the bonding material.

The firing contraction ratios of the unfired ceramic body A, the unfired ceramic body B and the bonding material can be obtained by preparing test pieces corresponding to these parameters and calculating the firing contraction ratios of these test pieces.

More particularly, for the test pieces of the unfired ceramic body A, sheet-like unfired ceramic bodies were prepared with the same material as that used for preparing the unfired ceramic body for forming the reference gas airspace layer and laminated in a plurality of stacks. Thereafter, the resulting unfired ceramic bodies were subjected to thermal compression bonding (at a temperature of 80° C. with a pressure of 50 MPa for 30 minutes), thereby obtaining a stacked body. Subsequently, the stacked body was cut into a test piece with a width of 5 mm and a length of 15 mm in dimension, after which the test piece was degreased at a temperature of 400° C. for 3 hours. Thus, the test piece for the unfired ceramic bodies A could be obtained.

Further, for the test pieces of the unfired ceramic body B, sheet-like unfired ceramic bodies were prepared with the same material as that used for preparing the unfired ceramic body for forming the reference gas airspace layer. Thereafter, the test pieces of the unfired ceramic body B could be obtained in the same method as that in which the unfired ceramic bodies A are manufactured.

For the test piece of the bonding material, the boning material was uniformly applied to a surface of a mold-releasing sheet and then shaped, upon which the resulting sheet was dried until the sheet could be contacted with a finger. Thereafter, the sheet was wound on a resin bar with a diameter of ϕ2 mm. Subsequently, the sheet was removed from the resin bar and, thereafter, dried at a temperature of 100° C. for 30 minutes. Thus, a test piece was obtained with a diameter of ϕ4 mm in length of 15 mm.

Next, dimensions (reference dimensions) of these test pieces were measured. Thereafter, the respective test pieces were fired at firing conditions and the dimensions of the fired test pieces were measured. With the present example, the firing was conducted by increasing a temperature from a room temperature up to a temperature of 1480° C. at a temperature rising rate of 60° C./h and kept at 1480° C. for two hours and subsequently standing to cool. The contraction ratios of the test pieces could be calculated using a formula expressed as Contraction rate (%)=Contracted Dimension/Reference Dimension×100.

Results of the firing contraction ratios of the unfired ceramic body A, the unfired ceramic body B and the bonding material, used for the test piece X1, are indicated on Table 1.

With the present example, gas sensing elements (test pieces X1 to X10 and X12 to X15) of 14 kinds were prepared using the bonding material containing the organic binders at different mixing ratios with the others being employed in a manner as that employed for the test piece X11. The contraction ratios of these test pieces were also measured and results are indicated on Table 1. As shown in Table 1, the firing contraction ratio of the bonding material can be adjusted by altering a volume ratio of the inorganic powder (alumina powder) and the organic binder (PVB) of the bonding material. Further, a plasticizer may be added to the bonding material. In this case, altering a volume ratio of inorganic powder and the plasticizer or a volume ratio of inorganic powder, the binder and the plasticizer enables the firing contraction ratios to be adjusted.

Table 1 describes the volume ratio (vol %) in terms of 100% of a volume ratio of the bonding material after a dried state (on a stage subsequent to the bonding step). The volume ratio (vol %) of the inorganic powder can be calculated using a formula expressed as $V=V1/(V1+V2)\times100$ where V1 represents the volume ratio of the inorganic powder after the bonding step (provided before the firing step) and V2 represents a volume of the organic binder.

Further, Table 1 also describes the volume (wt %) of the organic binder in terms of 100% of the inorganic powder in the bonding material. The weight W (wt %) of the organic binder can be calculated using a formula expressed as $W=W2/W1\times100$ where W1 represents the weight of the inorganic powder and W2 represents the weight of the organic binder.

In addition, Table 1 indicates viscosities of respective bonding materials. The viscosities were measured using a rotary viscometer (HBDV-II+) made by Brookfield. The measurements were conducted under a condition with a temperature of 25° C. and a rotation speed of 10 rpm.

With the present example, further, gas sensing elements (test piece X16 to test piece X28) of 13 kinds were prepared with the unfired ceramic bodies A and the unfired ceramic bodies B having firing contraction ratios different from each other.

These gas sensing elements were prepared suitably altering the amounts of organic binder used for the unfired ceramic bodies A and the unfired ceramic bodies B. In other respect, these gas sensing elements were prepared in a manner similar to the test piece X11. Like the test pieces X1 to X15, the firing contraction ratios of the unfired ceramic bodies A and the unfired ceramic bodies B and a difference between these parameters, a volume ratio of the inorganic powder of the bonding material, the amount of organic binder, viscosity and firing contraction ratios were measured and results are indicated in Table 2.

With the present example, furthermore, gas sensing elements (test pieces X9 to X37) of 9 kinds were prepared with the bonding material applied in thickness different from the test piece X11. These gas sensing elements were prepared in the manner similar to the test piece X11 except for altered thickness of the applied bonding material. Table 3 shows the thickness of the bonding material applied to the gas sensing elements (test pieces X29 to X37).

With the present example, moreover, gas sensing elements (test pieces X38 to X48) of 11 kinds were prepared using the unfired ceramic bodies A and the unfired ceramic bodies B having different firing contraction ratios while the bonding materials containing organic binders in different mixing ratios. These gas sensing elements were prepared by suitably altering the mixing ratios of the binding materials used in the bonding materials while suitably altering the amounts of organic binders used for the unfired ceramic bodies A and the unfired ceramic bodies B. In other respect, these gas sensing elements were prepared in the manner similar to the test piece X11. Table 4 indicates the firing contraction ratios of the bonding material, the unfired ceramic bodies A and the unfired ceramic bodies B of these gas sensing elements.

Next, void rates of bonding areas (bonding material layers) in the bonding materials for the test pieces (test pieces X1 to X48) were measured in a manner as described below.

Figure 5:
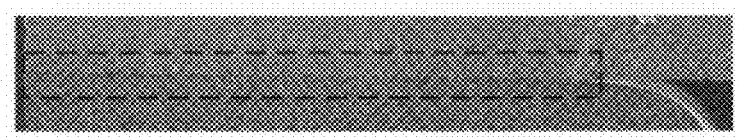
FIG. 5 is an illustrative view showing a scanning electron microscope photograph showing a periphery of a bonding area caused by the bonding material applied to the ceramic bonded body (gas sensing element) manufactured by the method of the present invention.
Figure 6:
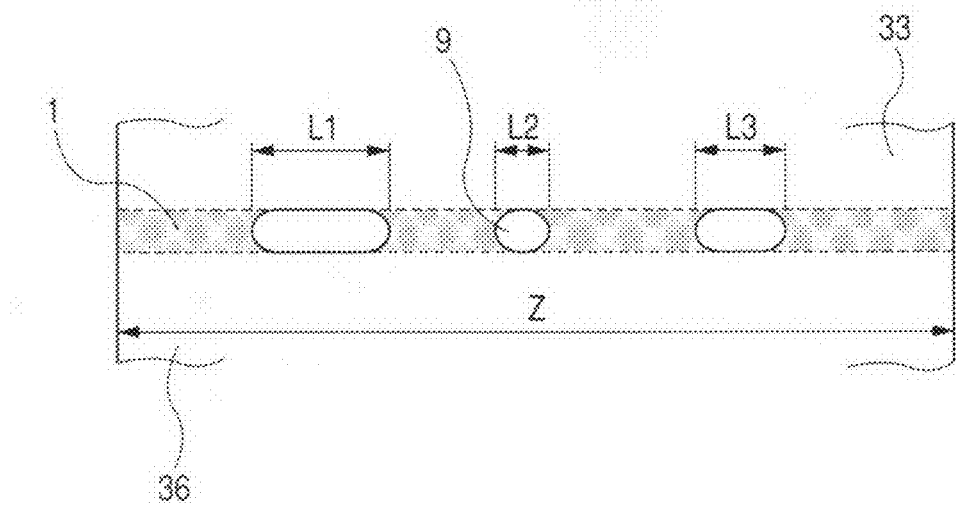
FIG. 6 is a cross-sectional view showing a bonding area in an enlarged scale at a portion surrounded with a broken line in FIG. 5.
Figure 7A:
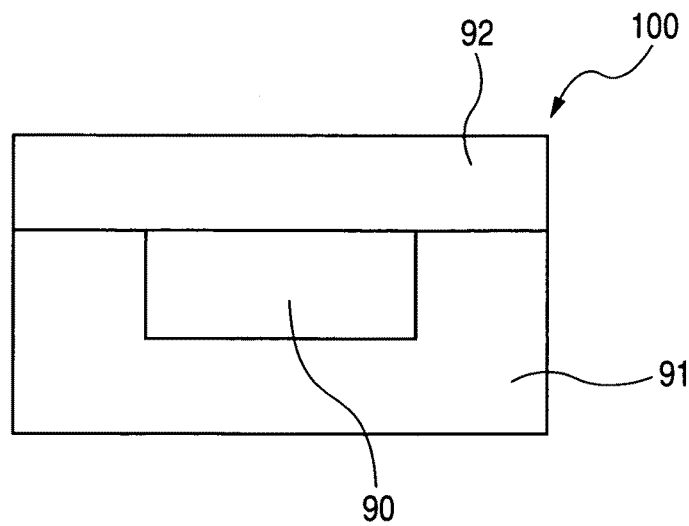
FIG. 7A is an illustrative view of a ceramic bonded body (sensing element) of one related art having unfired ceramic bodies A and B bonded to each other by thermally compression bonding technique.
Figure 7B:
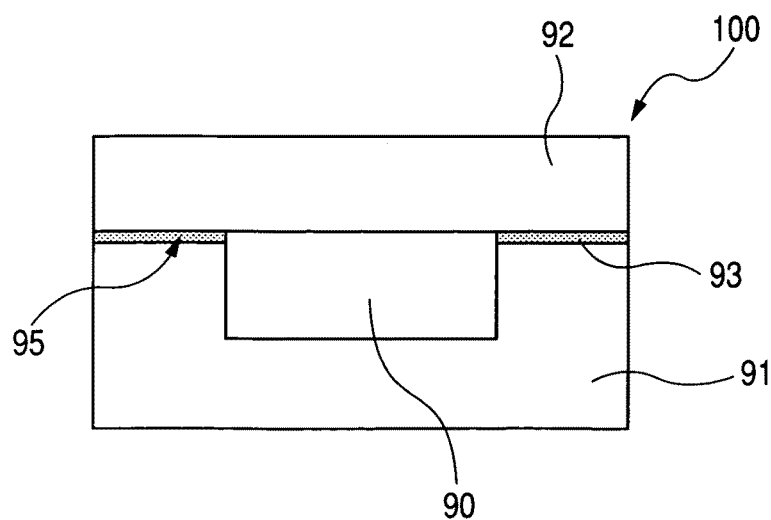
FIG. 7B is an illustrative view of a ceramic bonded body (sensing element) of another related art having unfired ceramic bodies A and B bonded to each other upon using a bonding material of the related art.

That is, first, the gas sensing element of each test piece was cut in a stack direction to observe the bonding area bonding material layer) with the use of a scanning electron microscope. An example of a SEM photograph is shown in FIG. 5. In addition, FIG. 6 shows a pattern diagram of a void state of the bonding area. FIG. 6 typically shows a patter of voids 9 present in the bonding material layer 1 formed between the solid electrolyte body 33 and the reference gas airspace forming layer 36.

As shown in FIG. 6, in measuring the void rate, a length (Z) of the bonding area was measured and lengths (maximal lengths L1, L2 and L3 of the voids placed on a plane parallel to the length of the bonding area) of the respective voids 9 were measured, respectively. The void rate R (%) can be calculated in a formula expressed as $R=S/Z\times100$ where "S" represents a sum of lengths of the respective voids.

The void rates of the respective test pieces are indicated on Tables 1 to 4.

Further, the existence or nonexistence of a delamination in the bonding area was observed upon the SEM observation mentioned above. Results are shown in Tables 1 to 4.

In Tables 1 to 4, "S" represents a firing contraction ratio (%); "M1" the amount (vol %) of an inorganic powder, "M2" the amount (vol %) of an organic binder; "P" a viscosity (Pa·s); "T" a thickness (μm); "E1" a result on an overall evaluation on a case in which the void rate was 3% or less and no delamination was observed; "E2" a result on an overall evaluation on a case in which the void rate was 10% or less and no delamination was observed; and "E3" a result on an overall evaluation on a case in which the void rate exceeded 10% or the delamination was observed.

TABLE 1

| Test Piece No. | S (%) X | S (%) Y | \|X−Y\| | Bonding Material M1 (vol %) | M2 (wt %) | P (Pa·s) | S (%) | T (μm) | S (%) X−Z | S (%) Y−Z | Void Rate (%) | Delaminat | Overall Evaluat. |
|---|---|---|---|---|---|---|---|---|---|---|---|---|---|
| X1 | 17.5 | 17.5 | 0.0 | 47.4 | 31.1 | 30 | 19.0 | 18.0 | −1.5 | −1.5 | — | Present | E3 |
| X2 | | | | 48.0 | 30.4 | 28 | 18.8 | | | −1.3 | −1.3 | — | Present | E3 |

TABLE 1-continued

| Test Piece No. | S (%) X | S (%) Y | S (%) \|X − Y\| | Bonding Material M1 (vol %) | Bonding Material M2 (wt %) | Bonding Material P (Pa · s) | Bonding Material S (%) | Bonding Material T (μm) | S (%) X − Z | S (%) Y − Z | Void Rate (%) | Delaminat | Overall Evaluat. |
|---|---|---|---|---|---|---|---|---|---|---|---|---|---|
| X3 | | | | 49.0 | 29.2 | 33 | 18.5 | | −1 | −1 | — | Present | E3 |
| X4 | | | | 51.0 | 27.0 | 36 | 18.0 | | −0.5 | −0.5 | — | Present | E3 |
| X5 | | | | 52.0 | 25.9 | 29 | 17.9 | | −0.4 | −0.4 | 14 | Absent | E3 |
| X6 | | | | 56.2 | 21.9 | 31 | 17.5 | | 0 | 0 | 3 | Absent | E1 |
| X7 | | | | 62.5 | 16.8 | 34 | 17.3 | | 0.2 | 0.2 | 1 | Absent | E1 |
| X8 | | | | 62.3 | 17.0 | 36 | 17.2 | | 0.3 | 0.3 | 1 | Absent | E1 |
| X9 | | | | 67.0 | 13.8 | 34 | 16.8 | | 0.7 | 0.7 | 0 | Absent | E1 |
| X10 | | | | 70.6 | 11.7 | 38 | 16.5 | | 1 | 1 | 0 | Absent | E1 |
| X11 | | | | 73.7 | 10.0 | 35 | 15.8 | | 1.7 | 1.7 | 0 | Absent | E1 |
| X12 | | | | 79.0 | 7.5 | 38 | 15.3 | | 2.2 | 2.2 | 6 | Absent | E2 |
| X13 | | | | 80.3 | 6.9 | 38 | 15.2 | | 2.3 | 2.3 | 4 | Absent | E2 |
| X14 | | | | 84.1 | 5.3 | 48 | 14.9 | | 2.6 | 2.6 | 8 | Absent | E2 |
| X15 | | | | 86.2 | 4.5 | 51 | 14.4 | | 3.1 | 3.1 | — | Present | E3 |

TABLE 2

| Test Piece No. | S (%) X | S (%) Y | S (%) \|X − Y\| | Bonding Material M1 (vol %) | Bonding Material M2 (wt %) | Bonding Material P (Pa · s) | Bonding Material S (%) | Bonding Material T (μm) | S (%) X − Z | S (%) Y − Z | Void Rate (%) | Delaminat | Overall Evaluat. |
|---|---|---|---|---|---|---|---|---|---|---|---|---|---|
| X16 | 17.1 | 17.0 | 0.1 | 73.7 | 10.0 | 35 | 15.8 | 18.0 | 1.3 | 1.2 | 0 | Absent | E1 |
| X17 | 18.4 | 18.2 | 0.2 | | | | | | 2.6 | 2.4 | 9 | Absent | E2 |
| X18 | 17.1 | 17.5 | 0.4 | | | | | | 1.3 | 1.7 | 0.4 | Absent | E1 |
| X19 | 18.4 | 17.8 | 0.6 | | | | | | 2.6 | 2.0 | 7 | Absent | E2 |
| X20 | 17.1 | 16.4 | 0.7 | | | | | | 1.3 | 0.6 | 6 | Absent | E2 |
| X21 | 17.1 | 17.8 | 0.7 | | | | | | 1.3 | 2.0 | 3 | Absent | E1 |
| X22 | 17.1 | 16.3 | 0.8 | | | | | | 1.3 | 0.5 | 8 | Absent | E2 |
| X23 | 17.1 | 18.0 | 0.9 | | | | | | 1.3 | 2.2 | 3 | Absent | E1 |
| X24 | 18.4 | 17.5 | 0.9 | | | | | | 2.6 | 1.7 | 0 | Absent | E1 |
| X25 | 17.1 | 18.2 | 1.1 | | | | | | 1.3 | 2.4 | 14 | Absent | E3 |
| X26 | 18.4 | 17.0 | 1.4 | | | | | | 2.6 | 1.2 | — | Present | E3 |
| X27 | 18.4 | 16.4 | 2.0 | | | | | | 2.6 | 0.6 | — | Present | E3 |
| X28 | 18.4 | 16.3 | 2.1 | | | | | | 2.6 | 0.5 | 15 | Absent | E3 |

TABLE 3

| Test Piece No. | S (%) X | S (%) Y | S (%) \|X − Y\| | Bonding Material M1 (vol %) | Bonding Material M2 (wt %) | Bonding Material P (Pa · s) | Bonding Material S (%) | Bonding Material T (μm) | S (%) X − Z | S (%) Y − Z | Void Rate (%) | Delaminat | Overall Evaluat. |
|---|---|---|---|---|---|---|---|---|---|---|---|---|---|
| X29 | 17.5 | 17.5 | 0 | 73.7 | 10.0 | 35 | 15.8 | 5 | 1.1 | 1.1 | — | Present | E3 |
| X30 | | | | | | | | 8 | | | 20 | Absent | E3 |
| X31 | | | | | | | | 10 | | | 3 | Absent | E1 |
| X32 | | | | | | | | 13 | | | 1 | Absent | E1 |
| X33 | | | | | | | | 16 | | | 0 | Absent | E1 |
| X34 | | | | | | | | 20 | | | 0 | Absent | E1 |
| X35 | | | | | | | | 25 | | | 7 | Absent | E2 |
| X36 | | | | | | | | 28 | | | 16 | Absent | E3 |
| X37 | | | | | | | | 33 | | | — | Present | E3 |

TABLE 4

| Test Piece No. | S (%) X | S (%) Y | S (%) \|X − Y\| | Bonding Material M1 (vol %) | Bonding Material M2 (wt %) | Bonding Material P (Pa · s) | Bonding Material S (%) | Bonding Material T (μm) | S (%) X − Z | S (%) Y − Z | Void Rate (%) | Delaminat | Overall Evaluat |
|---|---|---|---|---|---|---|---|---|---|---|---|---|---|
| X38 | 17.1 | 17.0 | 0.1 | 73.7 | 10.0 | 35 | 15.8 | 18.0 | 1.3 | 1.2 | 2 | Absent | E1 |
| X39 | 18.4 | 18.2 | 0.2 | 56.2 | 21.9 | 31 | 17.5 | | 0.9 | 0.7 | 0.4 | Absent | E1 |
| X40 | 18.4 | 18.0 | 0.4 | 56.2 | 21.9 | 31 | 17.5 | | 0.9 | 0.5 | 0 | Absent | E1 |
| X41 | 18.4 | 17.8 | 0.6 | 56.2 | 21.9 | 31 | 17.5 | | 0.9 | 0.3 | 0 | Absent | E1 |
| X42 | 17.1 | 16.3 | 0.8 | 73.7 | 10.0 | 35 | 15.8 | | 1.3 | 0.5 | 3 | Absent | E1 |

TABLE 4-continued

| Test Piece No. | S (%) X | S (%) Y | \|X − Y\| | Bonding Material M1 (vol %) | M2 (wt %) | P (Pa·s) | S (%) | T (μm) | S (%) X − Z | Y − Z | Void Rate (%) | Delaminat | Overall Evaluat |
|---|---|---|---|---|---|---|---|---|---|---|---|---|---|
| X43 | 18.4 | 17.5 | 0.9 | 56.2 | 21.9 | 31 | 17.5 | | 0.9 | 0.0 | 6 | Absent | E2 |
| X44 | 17.1 | 18.0 | 0.9 | 73.7 | 10.0 | 35 | 15.8 | | 1.3 | 2.2 | 2 | Absent | E1 |
| X45 | 18.4 | 17.5 | 0.9 | 73.7 | 10.0 | 35 | 15.8 | | 2.6 | 1.7 | 8 | Absent | E2 |
| X46 | 17.1 | 18.2 | 1.1 | 73.7 | 10.0 | 35 | 15.8 | | 1.3 | 2.4 | 22 | Absent | E3 |
| X47 | 18.4 | 17.0 | 1.4 | 73.7 | 10.0 | 35 | 15.8 | | 2.6 | 1.2 | — | Present | E3 |
| X48 | 18.4 | 16.4 | 2.0 | 73.7 | 10.0 | 35 | 15.8 | | 2.6 | 0.6 | — | Present | E3 |

As will be apparent from Tables 1 to 4, the bonding material satisfies the relationships expressed as $0 \leq X - Z \leq 2.6$ and $0 \leq Y - Z \leq 2.6$ where "X" represents the firing contraction ratio of the unfired ceramic body A, "Y" the firing contraction s ratio of the unfired ceramic body B and "Z" the firing contraction ratio of tile bonding material. This bonding material is applied to the bonding areas between the unfired ceramic bodies A and B, both of which have the firing contraction ratio remains in 1%, so as to provide a thickness ranging from 10 to 25 μm. The resulting ceramic bonded bodies (gas sensing elements) had no occurrence of delamination with extremely low incidence rate of voids. In addition, it is turned out that using a bonding material particularly satisfying the relationships expressed as $0 \leq X - Z \leq 1.7$ or $0 \leq Y - Z \leq 1.7$ enables a further reduction in the incidence rate of voids.

Although the present invention has been described with reference to the various embodiments, it will be appreciated that the particular arrangements disclosed are meat to be illustrative only and not limiting to the scope of the present invention. That is, the present invention can be implemented in other specific forms.

What is claimed is:

1. A method of manufacturing a ceramic bonded body using an unfired ceramic body A, internally formed with a cavity portion or having a bonding material layer formed with a concaved portion, and an unfired ceramic body B bonded to the unfired ceramic body A and then fired to obtain the ceramic bonded body, the method comprising the steps of:
   preparing the unfired ceramic bodies A and B satisfying the relationship expressed as $|X - Y| \leq 1$ where "X" represents a firing contraction ratio (%) of the unfired ceramic body A and "Y" represents a firing contraction ratio (%) of the unfired ceramic body B, each of the unfired ceramic body A and the unfired ceramic body B comprising alumina or zirconia, wherein the firing contraction ratio of the unfired ceramic body A is different from the firing contraction ratio of the unfired ceramic body B;
   applying a bonding material onto at least one bonding surface of the unfired ceramic bodies A and B in a thickness ranging from 10 to 25 μm;
   bonding the unfired ceramic bodies A and B after the step of applying the bonding material for preparing a bonded body;
   firing the bonded body to prepare the ceramic bonded body; and
   the bonding material containing an inorganic powder, an organic binder and an organic solvent in a composition to satisfy relationships expressed as $0.2 \leq X - Z < 2.6$ and $0.2 \leq Y - Z < 2.6$ where "Z" represents a firing contraction ratio of the bonding material.

2. The method of manufacturing the ceramic bonded body according to claim 1, wherein:
   the step of bonding the unfired ceramic bodies A and B comprises:
   a first bonding step of sticking the unfired ceramic bodies A and B via a bonding surface applied with the bonding material and pressing a bonding area between the unfired ceramic bodies A and B at a temperature of 40° C. or less under a pressure ranging from 0.80 to 6.5 MPa applied therebetween; and
   a second bonding step of drying the bonded portion at a temperature ranging from 70° C. to 120° C.

3. The method of manufacturing the ceramic bonded body according to claim 2, wherein:
   the first bonding step is conducted under an atmospheric pressure of 0.6 MPa or less.

4. The method of manufacturing the ceramic bonded body according to claim 1, wherein:
   the ceramic bonded body is a gas sensing element.

5. The method of manufacturing the ceramic bonded body according to claim 1, wherein:
   the bonding material contains the same ceramic material as that of at least one of the unfired ceramic bodies A and B as the inorganic powder.

6. The method of manufacturing the ceramic bonded body according to claim 1, wherein:
   the bonding material satisfies relationships expressed as $0.2 \leq X - Z \leq 1.7$ and $0.2 \leq Y - Z \leq 1.7$.

7. The method of manufacturing the ceramic bonded body according to claim 1, wherein:
   the bonding material has a viscosity ranging from 15 to 150 Pa·s.

8. The method of manufacturing the ceramic bonded body according to claim 1, wherein:
   the bonding material satisfies relationships expressed as $1.7 \leq X - Z \leq 2.6$ and $1.7 \leq Y - Z \leq 2.6$.

* * * * *